April 24, 1956 J. P. RATIGAN 2,743,122
LUBRICATED STUFFING BOX FOR POLISH ROD
Filed March 21, 1952 3 Sheets-Sheet 1

JAMES P. RATIGAN, INVENTOR.

BY

ATTORNEYS

JAMES P. RATIGAN,
INVENTOR.

BY Lyon & Lyon
ATTORNEYS

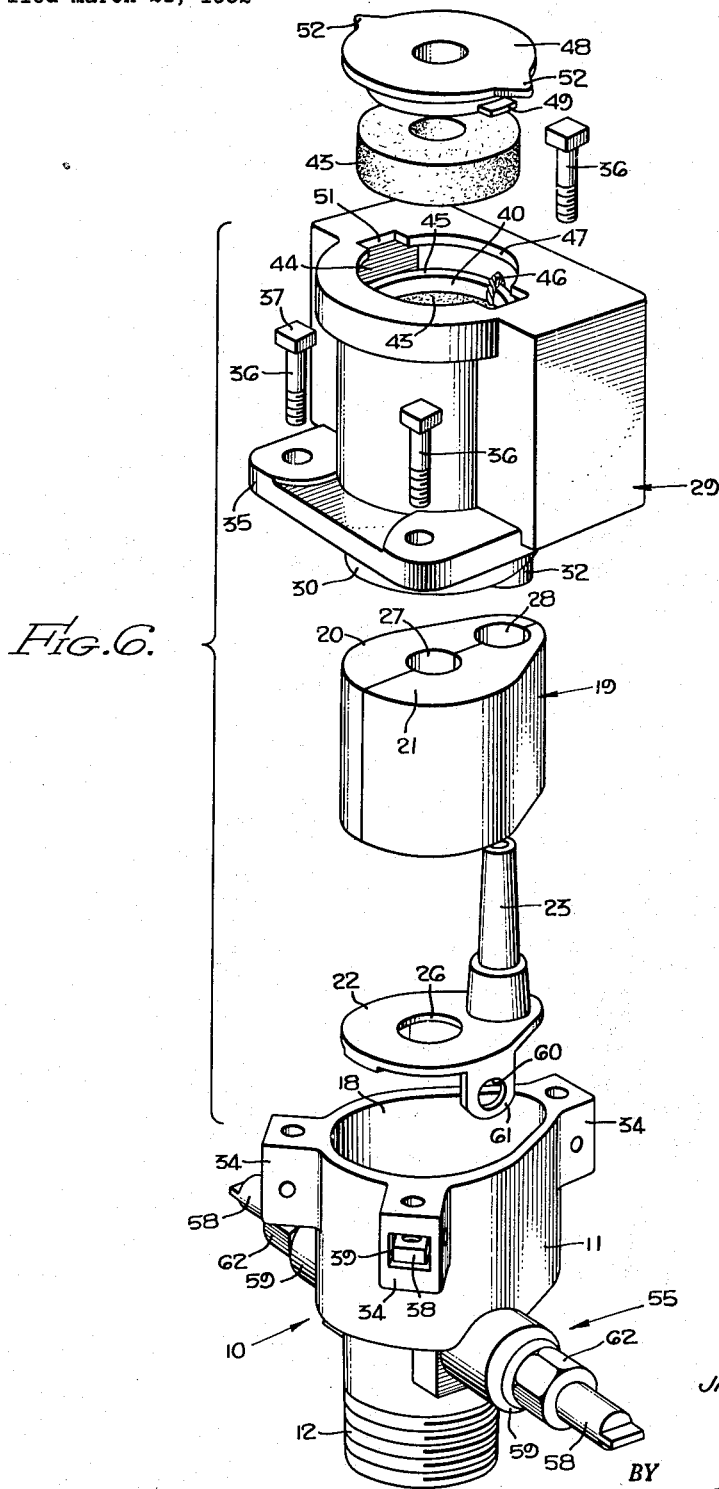

United States Patent Office 2,743,122
Patented Apr. 24, 1956

2,743,122

LUBRICATED STUFFING BOX FOR POLISH ROD

James P. Ratigan, Los Angeles, Calif., assignor to J. P. Ratigan, Inc., Los Angeles, Calif., a corporation of California Application March 21, 1952, Serial No. 277,790

1 Claim. (Cl. 286—16)

My invention relates to an improved form of stuffing box of the type used to pack off a reciprocating rod such as the polish rod in an oil well pumping installation. The present invention relates to improvements over the device shown in my prior Patent No. 2,380,189, issued July 10, 1945, for "Stuffing Box."

The stuffing box construction shown in my prior patent provides means for lubricating the non-metallic sealing elements from the fluid produced by the well. So long as well fluid reaches the stuffing box the seal members remain lubricated and have a long service life. Certain wells, however, flow by "heads," that is, a heavy flow occurs at intervals but there are periods between flows in which no well fluid at all reaches the stuffing box. If such periods extend for a considerable length of time the fluid within the stuffing box may be depleted to the point where satisfactory lubrication of the sealing elements is no longer obtained. In such event the reciprocating motion of the polish rod within the relatively dry sealing elements may damage the latter so that they fail to seal properly when the next "head" or flow of fluid occurs.

Accordingly, it is an object of the present invention to provide a stuffing box assembly which will be self-lubricating while well fluid is being produced and which will operate satisfactorily for extended periods between "heads" on wells in which the flow occurs at intervals.

A related object is to provide a lubricated stuffing box assembly for a polish rod having a first oiling system which lubricates the sealing elements by means of the well fluid and a second oiling system which comes into action upon failure of the first system to prevent damage to the sealing elements.

Another object is to provide a lubricated stuffing box assembly which retains the advantages of the device disclosed in my prior patent and which supplements the action of that device by providing a secondary oiling system including a reservoir.

Another object is to provide an attachment for devices of the type shown in my prior patent which serves to provide a second oiling system for the device which supplements the self-oiling system present in the patented devices.

A more detailed object is to provide such an attachment having a reservoir for storage of lubricant.

Other and more detailed objects and advantages will appear hereinafter.

Figure 2:
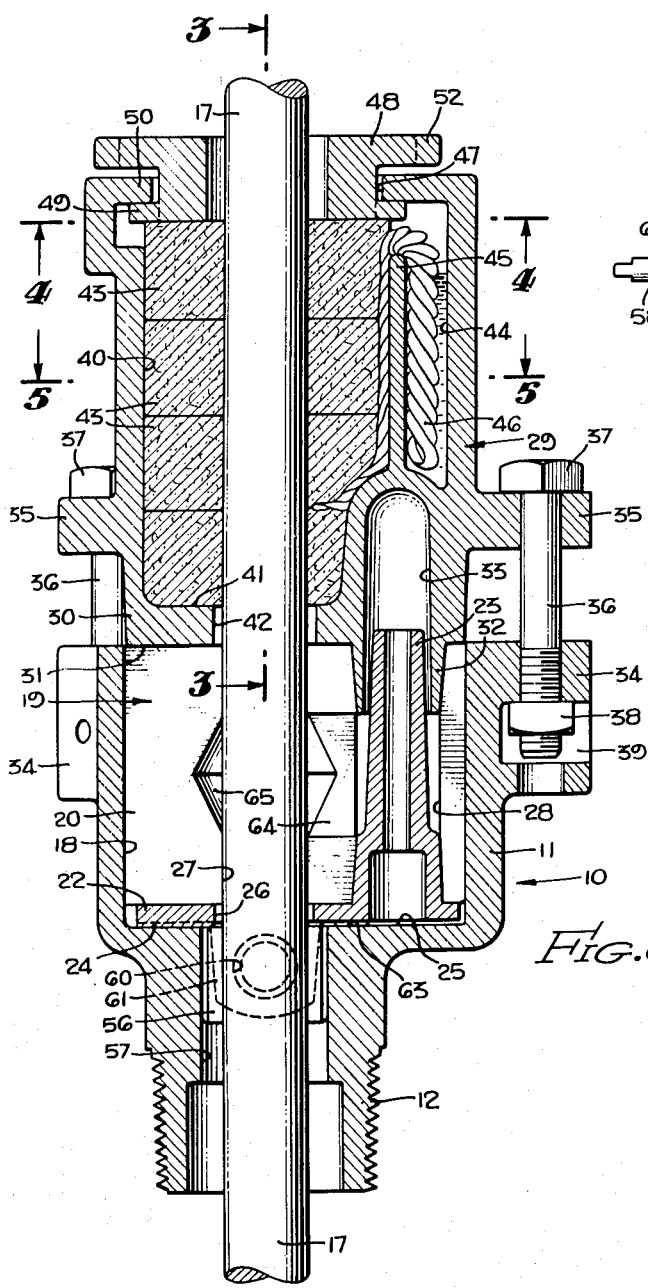
Figure 2 is a sectional elevation taken substantially on the line 2—2 as shown in Figure 1.
Figure 3:
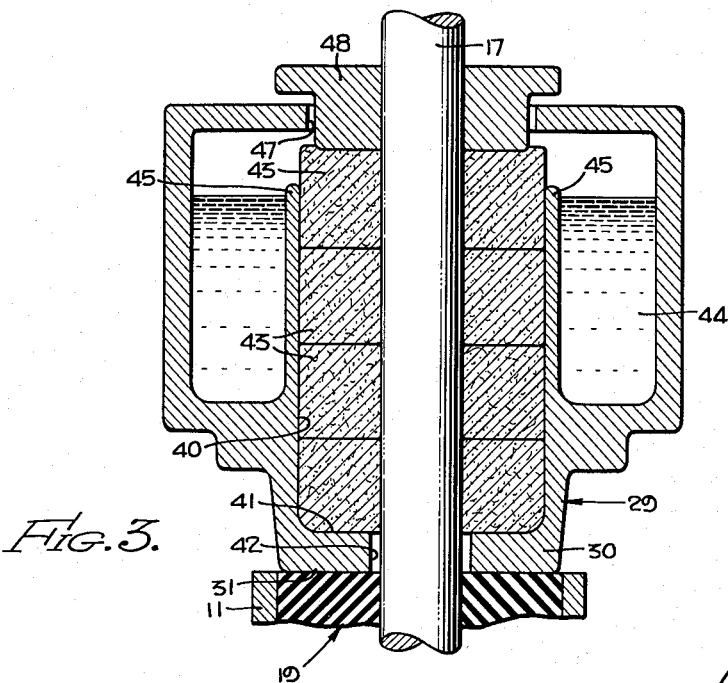
Figure 3 is a sectional elevation taken substantially on the line 3—3 as shown in Figure 2.
Figure 4:
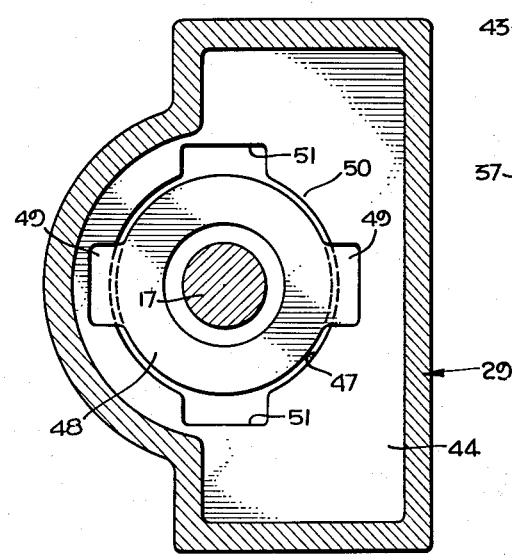
Figure 5:
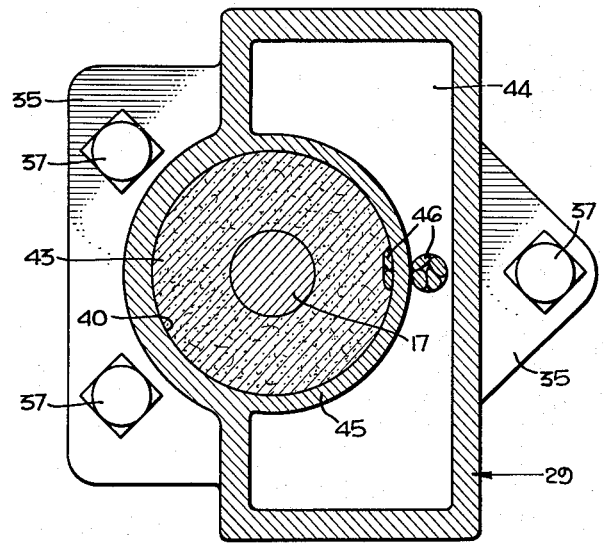

Figures 4 and 5 are sectional plan views taken substantially on the lines 4—4 and 5—5 as shown in Figure 2.

Figure 6 is a perspective view showing the manner of assembly of the various parts of the device.

Referring to the drawings, the lubricated stuffing box assembly generally designated 10 is provided with a body 11 having a downward projecting threaded portion 12 connected to an internally threaded nipple 13. The nipple 13 is connected to a well head assembly 14 which includes a fluid conducting pipe 15 and lateral branch pipes 16. The polish rod 17 extends longitudinally through the well head assembly 14, nipple 13 and stuffing box assembly 10. The polish rod 17 is connected in the usual way to the sucker rods (not shown) which operate the pump in the well. The pipe 15 is connected to the eduction tubing through which the well fluid is raised from the pump.

The body 11 is provided with a noncircular recess 18 for reception of the sealing unit 19. This unit 19 preferably takes the form shown in my copending application Serial No. 243,433, filed August 24, 1951, now Patent No. 2,685,465, although it may be formed of a pair of vertically spaced resilient sealing elements separated by a nonresilient spacer as shown in my prior patent, if desired. This unit 19 preferably comprises a pair of split halves 20 and 21 which are shaped to be received within the noncircular recess 18. The elements 20 and 21 are duplicates and are formed of resilient material, for example, synthetic rubber. The sealing unit 19 rests on the plate 22 which is provided with an integral stand pipe 23. The plate 22 is provided with spaced lugs 24 which rest on the floor 25 of the recess 18. A central opening 26 is provided in the plate 22 for clearance around the polish rod 17. The polish rod extends through the opening 27 in the sealing unit 19, and stand pipe 23 extends into the offset opening 28.

In accordance with the present invention a housing 29 is provided which rests on the sealing unit 19. The lower portion 30 of the housing 29 is shaped to be received within the noncircular recess in the body 11, and the lower surface 31 of the housing 29 rests on the upper surface of the sealing unit 19. A tubular projection 32 extends downward into the upper end of the opening 28 in telescopic relationship with the stand pipe 23. A central cavity 33 is provided in the tubular projection 32, and this cavity extends upward into the housing 29, as clearly shown in Figure 2.

A plurality of laterally projecting lugs 34 are integrally formed on the body 11 and corresponding lugs 35 are provided on the housing 29. Bolts 36 extend through openings provided in the lugs and serve to clamp the housing 29 against separation from the body 11. Turning of the bolt heads 37 serves to apply a downward force to the upper end of the sealing unit 19 and thereby forces the sealing elements 20 and 21 into intimate sealing contact with the polish rod 17. The nuts 38 are received in cavities 39 which prevent rotation of the nuts.

The housing 29 is provided with a central bore 40 which extends coaxial of the polish rod 17 and which terminates in a shoulder 41 at its lower end. A central opening 42 provides clearance around the polish rod. A plurality of nonmetallic annular rings 43 are mounted in the housing bore 40. These rings are preferably formed of felt or similar material capable of absorbing lubricating oil.

The housing 29 is also provided with a storage reservoir 44 which communicates with the central bore 40 through the space above the upper end of the wall 45. A wick element 46 extends into the reservoir 44, passes over the upper end of the wall 45, and extends down into the interior of the bore 40. The felt rings 43 are relatively soft and resilient and distort easily to make room for the wick. The function of the wick is to furnish a supply of oil from the reservoir 44 to the felt rings 43 within the bore 40. The rings 43 and wick 46 may be installed in the housing 29 through the upper open end 47. The cap 48 may then be placed in operative position to prevent displacement of the rings 43 as the polish rod 17 reciprocates. As shown in Figure 4 the cap 48 is provided with diametrically projecting lugs 49 which extend under the lip 50 provided on the upper end of the housing 29. A pair of openings 51 is provided on the upper end of the housing 29 through which the lugs 49 may pass. From this description it will be understood that installation of the cap 48 on the housing 29 is accomplished by lowering the lugs 49 through the openings 51 and then rotating the cap to bring the lugs 49 to the position of misalignment with respect to the openings 51, thereby preventing upward removal of the cap 48. The cap 48 may be provided with outwardly directed pointers 52 which indicate the position of the lugs 49 when the cap is in position on the upper end of the housing 29.

When the sealing unit 19 becomes worn after a period of service the bolts 36 are tightened to cause the surface 31 to move downward into the recess 18 and thereby distort the sealing unit 19 into sealing engagement with the polish rod 17. In this way the bolts may be tightened at intervals to maintain the efficiency of the seal. After the sealing unit has been worn to the point where replacement is necessary the bolts 36 are loosened and withdrawn from the lugs 34 to permit upward movement of the housing 29 relative to the body 11. The sealing unit 19 can then be withdrawn upwardly out of the recess 18. The duplicate sections 20 and 21 may be separated laterally and removed from the polish rod. New sections 20 and 21 are installed laterally about the polish rod and are placed in operative position.

Figure 1:
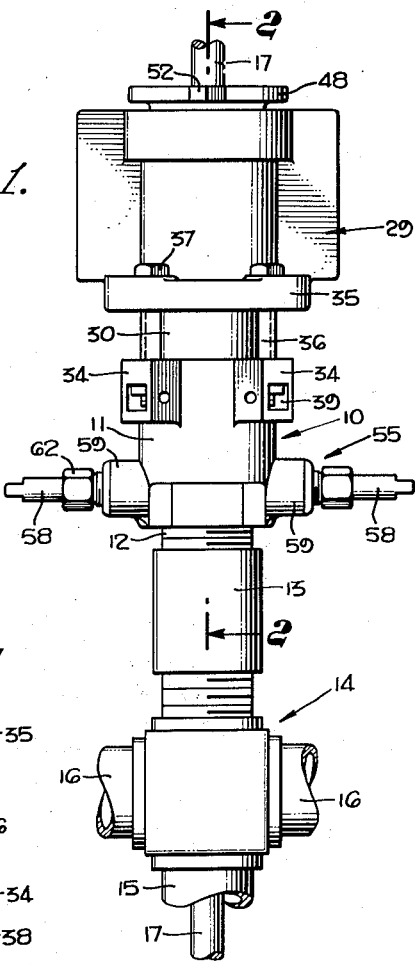
Figure 1 is a side elevation of a polish rod stuffing box embodying my invention.

Some wells continue to "head" for some time after the reciprocation of the polish rod has been stopped for the purpose of changing the sealing unit 19. In order to prevent well fluid from flowing upward through the cavity 18 while the packing unit 19 is being changed, a shutoff device generally designated 55 may be provided in the lower portion of the body 11. Such a shutoff device is shown in my prior patent. This device may employ a pair of resilient sealing blocks 56 (see Figure 2) which may be moved transversely of the body axis into engagement with the polish rod 17 and into mutual end-to-end engagement to shut off flow through the bore 57. Screw elements 58, Figure 1, are threaded within the bosses 59 and their inner ends extend through apertures 60 provided on the tabs 61 which extend downward from the plate 22. Stuffing box elements 62 prevent leakage at the point where the screw elements 58 extend out of the bosses 59.

In the operation of the device the parts are assembled as shown in Figure 2 and the screw elements 58 of the shutoff device 55 are retracted so that the resilient blocks 56 do not contact the polish rod 17. The reservoir 44 is filled with lubricating oil from any convenient source. The felt disks 43 are also saturated with the lubricating oil and the wick 46 which communicates with the reservoir 44 insures that the disks 43 remain saturated. The housing 11 is also initially filled with lubricating oil. The reciprocation of the polish rod 17 is then begun.

If the well fluid is produced at a steady rate the polish rod 17 is lubricated by the well fluid which fills the bore 57, nipple 13 and well head 14. On the upstroke of the polish rod 17 the major portion of the well fluid adhering to its surface is scraped off by the sealing unit 19 and a part of this fluid so removed passes through space 63 under the plate 22 and out through the stand pipe 23 into the cavity 33. The well fluid then returns into the opening 28 in the sealing unit 19 and passes through a lateral slot 64 into the central cavity 65 of the sealing unit. So long as the well continues to produce well fluid without interruption the well fluid adhering to the surface of the polish rod 17 automatically lubricates the sealing unit 19 in the manner just described.

If the well should produce fluid by "heads," however, and if the time interval between heads is a considerable one, the supply of well fluid within the body 11 may be depleted so that the sealing unit 19 would be inadequately lubricated. Before this condition occurs, however, the lubricating oil in the felt washers 43 provides sufficient lubricant to prevent damage to the sealing unit 19. The sealing unit 19 is therefore prevented from running dry.

The capacity of the reservoir 44 is sufficiently large so that the polish rod can be lubricated from it for an extended period. Since oil is drawn from the reservoir 44 only during the intervals when the supply of lubricant in the body 11 has become exhausted between "heads" of the well, only relatively small amounts of oil are taken from the reservoir 44 each day. The lubricating oil in the reservoir 44 may be replenished from time to time as needed. The action of the supplementary lubricating means provided by the housing 29 and felt washers 43 is automatic in that practically no oil is taken from the reservoir 44 so long as the polish rod 17 operates in fluid produced from the well. This supplementary lubricating means comes into effect only when the amount of lubricant on the polish rod is depleted to the point where damage to the sealing unit 19 through overheating is imminent.

Having fully described my invention, it is to be understood that I do not wish to be limited to the details herein set forth, but my invention is of the full scope of the appended claim.

I claim:

For use in a well pump installation having an eduction tube with a pump at the lower end thereof and a lateral outlet near the upper end thereof, and having a reciprocating polish rod extending into the upper end of the eduction tube and connected by sucker rods to operate the pump to raise well fluid in the eduction tube, the improvement comprising, in combination: a body having a recess through which the polish rod extends, means for connecting the body to the upper end of the eduction tube, a sealing unit within the recess slidably engaging the polish rod to strip the major portion of the well fluid therefrom during the upstroke of the polish rod, means within the recess including a portion extending vertically through the sealing unit and having a passageway for conducting well fluid removed from the polish rod to the upper part of the recess, said sealing unit containing a cavity surrounding the polish rod and having passage means for conducting said well fluid to said cavity for lubricating said sealing unit, a housing resting on the sealing unit and having a bore through which the polish rod extends, annular means in the bore for absorbing and retaining oil and slidably contacting the polish rod, said housing having an oil reservoir partially surrounding said bore and separated therefrom by an upright wall, and wick means extending from said reservoir over the top edge of said upright wall and into said bore and into contact with said annular means for saturating said annular means with oil from said reservoir to insure the maintenance of adequate oil on the polish rod, whereby the sealing unit is lubricated by oil from the polish rod derived from said annular means in the event that the flow of well fluid in the eduction tube should be interrupted.

References Cited in the file of this patent

UNITED STATES PATENTS

| | | |
|---|---|---|
| 302,529 | Tyler | July 22, 1884 |
| 470,305 | Martin et al. | Mar. 8, 1892 |
| 1,391,317 | Hansen | Sept. 20, 1921 |
| 2,380,189 | Ratigan | July 10, 1945 |

FOREIGN PATENTS

| | | |
|---|---|---|
| 6,199 | Great Britain | of 1895 |